J. H. IREY.
MOWER SICKLE GRINDER.
APPLICATION FILED AUG. 23, 1911.

1,019,649.

Patented Mar. 5, 1912.
3 SHEETS—SHEET 1.

Witnesses
C. W. Kisseleff
H. H. Parsons

Inventor
J. H. Irey,
By Harry Ellis Chandler
Attorney

J. H. IREY.
MOWER SICKLE GRINDER.
APPLICATION FILED AUG. 23, 1911.
1,019,649.
Patented Mar. 5, 1912.
3 SHEETS—SHEET 3.
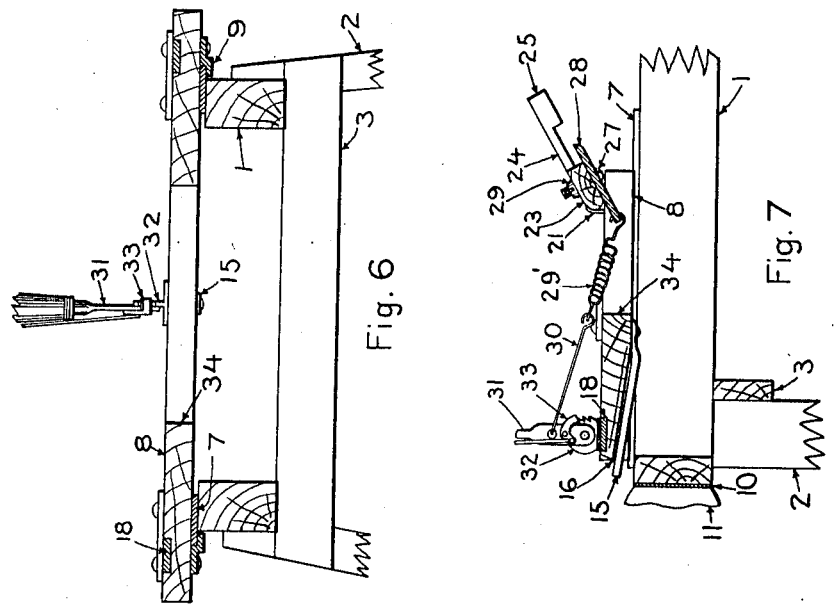
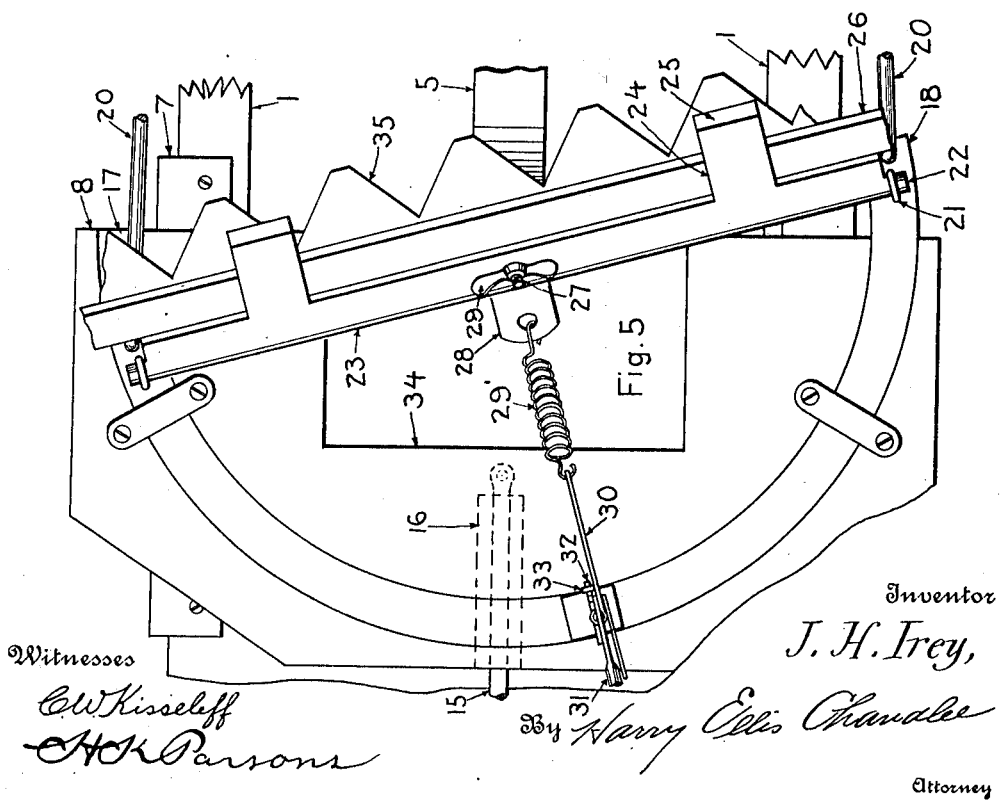

UNITED STATES PATENT OFFICE.

JAMES H. IREY, OF PELICAN RAPIDS, MINNESOTA.

MOWER-SICKLE GRINDER.

1,019,649.  Specification of Letters Patent.  Patented Mar. 5, 1912.

Application filed August 23, 1911. Serial No. 645,587.

*To all whom it may concern:*

Be it known that I, JAMES H. IREY, a citizen of the United States, residing at Pelican Rapids, in the county of Otter Tail and State of Minnesota, have invented certain new and useful Improvements in Mower-Sickle Grinders, of which the following is a specification.

My invention relates to improvements in grinding machines, and has for its leading object the provision of an improved attachment for use in connection with an ordinary grind stone which will serve to so hold a sickle bar with its cutting teeth bearing against the grind stone as to insure the correct grinding of the various cutting teeth.

The further object of my invention is the provision of an improved attachment of this character by the use of which any unskilled person may quickly and satisfactorily sharpen the sickle teeth of a mower.

Another object of my invention is the provision of an improved device which may be readily attached to the frame of an ordinary grind stone and which may be locked in adjusted position to resiliently hold the sickle bar teeth against the grind stone in position to grind the said teeth at the desired angle and which will thus enable one person to securely fasten the sickle bar in correct position to grind the teeth thereof and then move into position to turn the grind stone and be certain that the teeth are better held against the face of the stone than it is possible to hold the same by hand.

Other objects and advantages of my improved mower sickle tooth grinder will be readily apparent by reference to the following description taken in connection with the accompanying drawings and it will be understood that I may make any modifications in the specific structure shown and described within the scope of my claims without departing from or exceeding the spirit of my invention.

Figure 1:
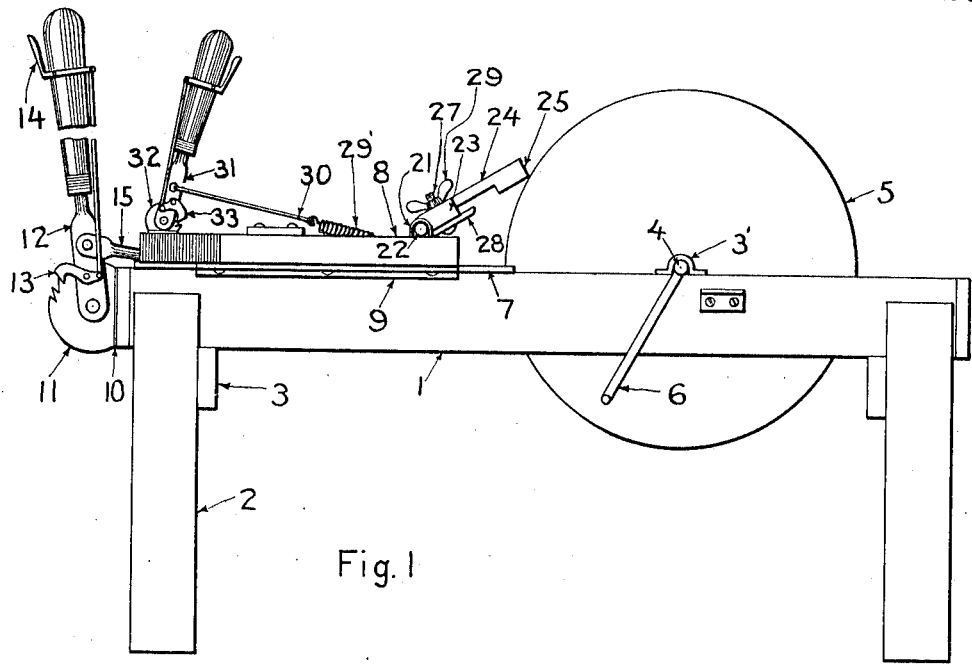
Figure 2:
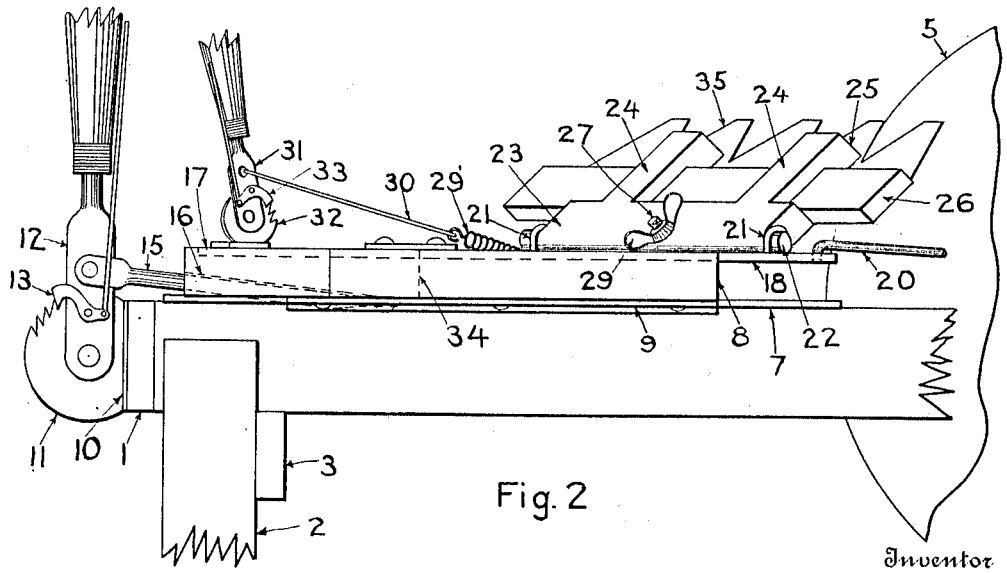
Figure 3:
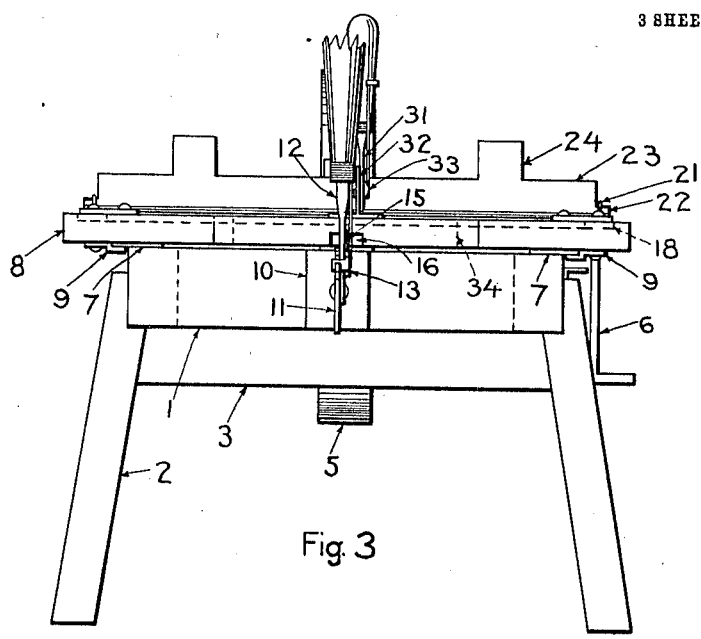
Figure 4:
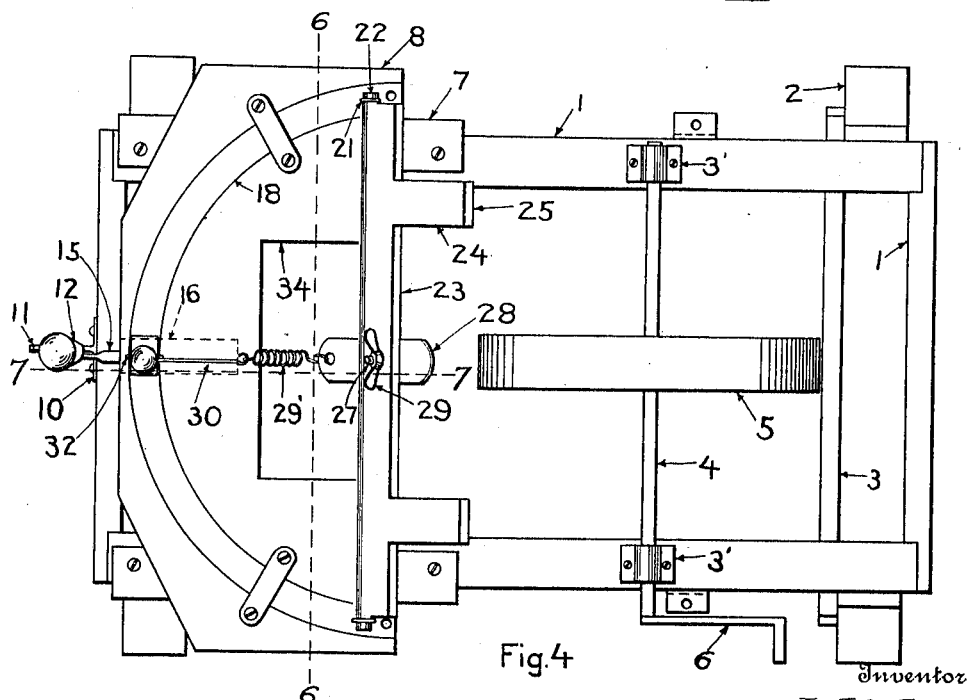

Figure 1 represents a side elevation of a grind stone having my attachment applied thereto. Fig. 2 represents an enlarged view of a portion of the grind stone and frame showing my attachment holding a sickle bar in position for grinding of the teeth thereof. Fig. 3 represents an end view of my invention. Fig. 4 represents a top plan view of Fig. 1. Fig. 5 represents a top plan view of Fig. 2. Fig. 6 represents a sectional view on the line 6—6 of Fig. 4, and Fig. 7 represents a sectional view on the line 7—7 of Fig. 4.

In the drawings, the numeral 1 designates the supporting frame of an ordinary grind stone having the legs 2 connected by the braces 3 and having the bearings 3' in which is rotatably engaged the shaft or axle 4 bearing the grind stone 5 disposed between the side members of the frame and having secured on its projecting end the crank handle 6 for turning the shaft and thus the grind stone.

Secured to the upper face of the side members of the frame 1 of the grind stone are the guide plates 7, while riding on said plates is the base block or table 8 of my invention. Said table member has secured to the under face thereof the Z-shaped guide plates 9 which extend around the plates 7 secured to the frame 1 and engage said plates to retain the table block thereon.

To regulate the sliding movement of the table block 8 along the frame 1, I secure to the end of the frame 1 the bracket plate 10 having the outwardly projecting sector shaped portion 11 to which is pivoted the controlling lever 12 provided with the usual locking pawl 13 controlled by the handle 14 and adapted to engage the toothed edge of the sector 11 to lock the lever 12 in adjusted position. A link 15 has one end pivoted to the lever 12 and extends through the groove 16 in the under side of the table block and is pivoted to the table block, rocking of the lever in different directions serving through the link to move the table block toward or away from the grind stone while the pawl 13 locks the lever and thus the table block into desired adjusted position. Said table block has formed in its upper face the semicircular or arcuate groove 17 in which is slidably mounted the carrier segment 18 having apertures formed in its ends to receive the hooked ends of the fastenings 20 which are pivoted to the frame 1 and serve to hold the member 18 in desired adjusted position. Said member 18 has rising therefrom near each end a bearing 21 in which is rotatably engaged the rounded end 22 of the clamp bar 23 which has secured thereto the clamp arms 24 provided with depending end portions 25 for fitting down over the front edge of the sickle bar 26. Passing centrally through the bar 23 is a bolt 27 having engaged on its lower headed end the clamp plate 28 and having engaged on its upper end the wing nut 29 which bears against the bar 23, the tightening of the said nut 29 drawing the plate 28 upward to cause the same to clamp the sickle bar against the arms 24 to securely hold the sickle bar in position. To resiliently swing the bar 23 and parts carried thereby downward on the ends 22 as pivots, I secure to the rear end of the plate 28 the helical spring 29 having secured to its rear end the link 30 which has its other end pivoted to the lever 31. Said lever 31 is pivoted to the upstanding portion of the bracket 32 which is secured to the center of the semicircular member 18, the lever being provided with a locking pawl 33 for engaging the bracket to lock the lever in adjusted position. To allow the rear end of the plate 28 to swing downward, I preferably cut away the front central portion of the base block 8 to provide the recess 34.

From the foregoing description taken in connection with the accompanying drawings the construction and use of my improved sickle grinding attachment for grind stones will be readily apparent and it will be seen that the spring 29 serves to swing the teeth 35 of the sickle bar against the grind stone and resiliently hold the same, the shifting of the lever 31 regulating the tension of the spring and the shifting of the lever 12 drawing the block 8 and thus the member 18 and the sickle toward or away from the grind stone to change the angle of grinding of the bevel on the sickle teeth.

It will further be observed that the swinging or shifting of the member 18 in the groove 17 serves to vary the angle at which the sides of the various teeth strike the grind stone while the anchoring or securing rods 20 serve to fasten the member 18 in desired adjusted position to insure the correct grinding of the sickle teeth.

It will thus be seen that I have provided a thoroughly practical, efficient and simple attachment for grind stones which will serve to satisfactorily support a sickle bar to insure of exact and ready grinding of the various teeth and cause said teeth to all be cut or ground at the same angle while permitting of regulation of the angle of cut or the bevel of the cut as desired.

I claim:

1. The combination with a frame, of a block slidable thereon, said block having an arcuate guide-way formed therein, an arcuate member slidable in the guide-way, means for locking the arcuate member in adjusted position, a grind stone supported by the frame adjacent the block, a clamping member pivotally connected to the arcuate member, a lever carried by the arcuate member, a plate secured to the clamping member, and a resilient connection between said plate and lever for holding an article clamped by the clamping member against the grind stone.

2. The combination with a frame, of a grind stone rotatably supported thereby, a block slidable on said frame, an arcuate guide-way formed therein, an arcuate member slidably mounted in said guide-way, a clamping member pivoted on the arcuate member, a lever mounted on the arcuate member, a spring having one end secured to the plate and its other end secured to a link carried by the lever, said lever being operable for swinging the clamp member on its pivot toward the grind stone, means carried by the lever to regulate the tension of said spring, and means for shifting the block and arcuate member relative to the grind stone.

3. The combination with a frame, of a grind stone rotatably supported thereby, a block slidable on the frame, means for securing the block in desired position relative to the grind stone, said block having an arcuate groove in the upper face thereof, an arcuate member slidably engaged in the groove, bearings rising from said member near the ends thereof, a clamp bar having its ends pivotally engaged in the bearings, a lever mounted on the arcuate member, a plate secured to the clamp member, and means connecting the plate and clamp bar, means for resiliently swinging the clamp bar on its pivot toward the grind stone, and means for locking the arcuate member in adjusted position to control the angle of grinding by the grind stone of an article held by the clamp bar.

In testimony whereof I affix my signature, in the presence of two witnesses.

JAMES H. IREY.

Witnesses:
JAMES A. BROWN,
W. B. WINDSOR.

---

Copies of this patent may be obtained for five cents each, by addressing the "Commissioner of Patents, Washington, D. C."